May 2, 1961 F. A. WANNEMACHER 2,982,420
COLLAPSIBLE SERVING TRAY ATTACHMENT
Filed June 17, 1957
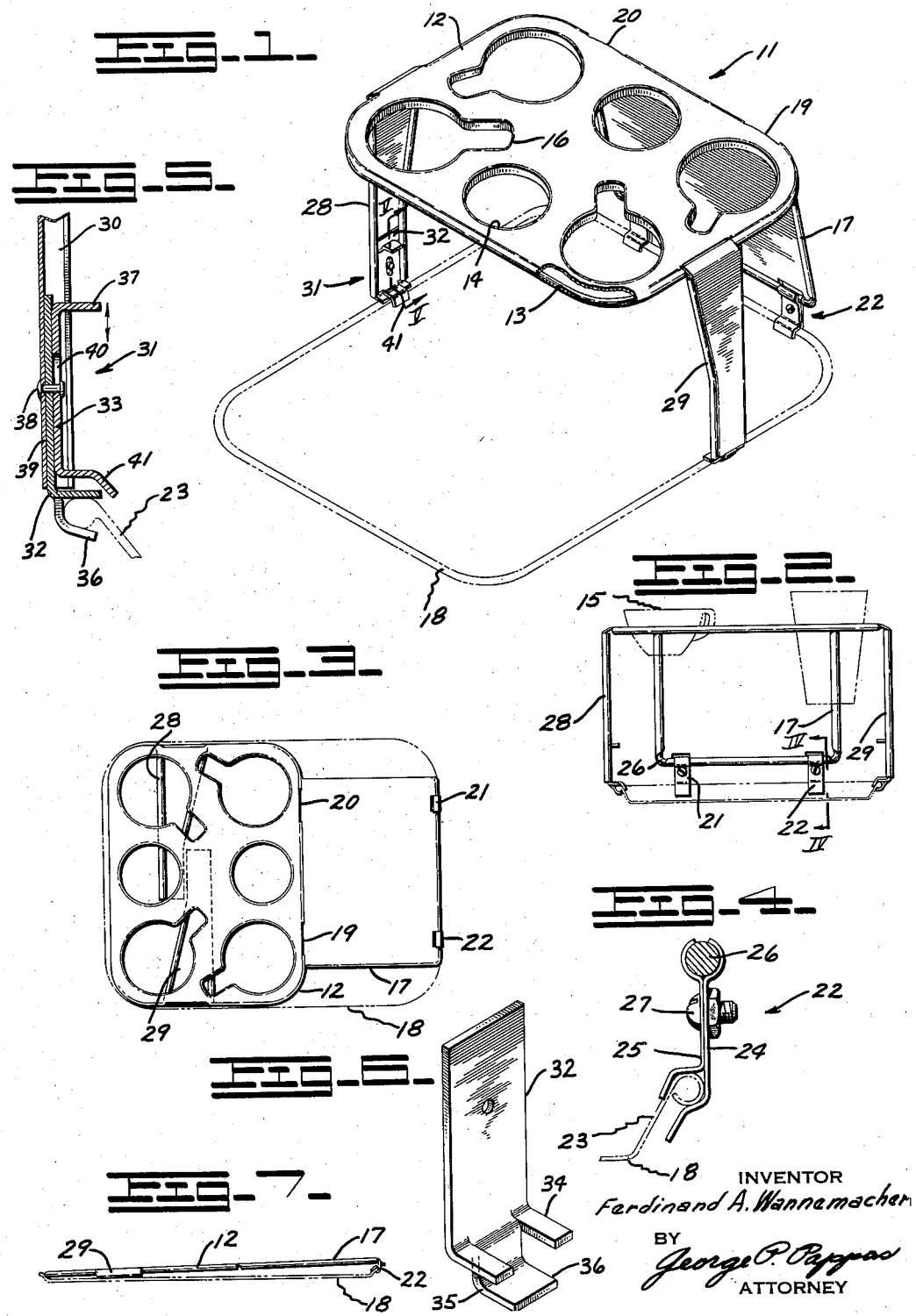
INVENTOR
Ferdinand A. Wannemacher
BY
George P. Pappas
ATTORNEY

United States Patent Office 2,982,420
Patented May 2, 1961

2,982,420
COLLAPSIBLE SERVING TRAY ATTACHMENT

Ferdinand A. Wannemacher, 413 W. Fayette Ave., Celina, Ohio

Filed June 17, 1957, Ser. No. 666,029

3 Claims. (Cl. 211—74)

This invention relates to a collapsible attachment for automobile serving trays and more particularly to a serving tray attachment which provides increased capacity to automobile serving trays and which is collapsible flatly on the serving tray when not in use.

Due to the increase in the number of automobiles in use in the United States, "drive-in" restaurants have become increasingly popular. Waiters and waitresses known as "car hops" take orders from the occupants of the automobiles and bring the food and beverages ordered to the occupants on serving trays which can be mounted upon the doors of the automobiles. There are several types of serving trays in use enabling either internal or external mounting on an automobile door. Thus, the occupants may order and consume their food without leaving their automobiles.

Necessarily, the size of the serving trays has been standardized into a rectangular shape to facilitate mounting on the automobile doors of various makes and models of cars. If the occupants order food and beverages in any great amount, more than one tray becomes necessary. This requires that the "car hops" make extra trips for the additional trays or tray.

In addition, beverage containers placed on the trays often tip due to the overcrowding of articles on the tray. Furthermore, beverage containers are often tipped by the gait of the "car hops" and by jostling of the tray while it is being mounted on the automobile door. The occupants also often spill the containers while reaching for their food on the crowded trays.

Previous attempts to increase the capacities of serving trays and add to the stability of containers placed thereon have resulted in cumbersome superstructures being built onto the serving trays. These have not been successful because of the storage problem created due to the fact that these serving trays must be stacked when not in use. These permanent superstructures that have been built onto serving trays have been intended only to stabilize beverage containers against tipping or other movement. Inasmuch as the beverage containers still rest on the serving tray, the use of such superstructures provide no additional space on the serving tray when it is needed to handle large orders. Heretofore, there have been no attempts to suspend the beverage containers above the serving tray thereby simultaneously stabilizing them and providing additional space on the tray for sandwiches and the like.

It is therefore an object of this invention to provide a collapsible tray attachment in association with an automobile door service tray, either of the internal or external mounting type.

Another object of this invention is to provide a serving tray attachment which may be collapsed flat on the service tray when not in use thereby greatly facilitating the storage of such trays.

A further object of this invention is to provide a serving tray attachment for increasing the capacity of an automobile serving tray by providing additional space for beverage containers when needed.

A still further object of this invention is to provide a collapsible serving tray attachment for suspension of containers above a serving tray thereby freeing additional space on the serving tray.

Still another object of this invention is to provide a serving tray attachment having a support plate with cut out portions therein for suspension of beverage containers.

An object of this invention is to selectively provide a rigid and stable food and beverage container attachment above a standard automobile serving tray.

Yet another object of this invention is to provide an apertured support plate having folding legs with serving tray clamps thereon and a back support member pivotally connecting said support plate to a serving tray.

An object of this invention is to provide an apertured support plate with a collapsible tripodal support so as to selectively provide a rigid and stable structure.

A further object of this invention is to provide collapsible tray attachment easily cleaned and capable of sanitary operation in use.

An additional object of this invention is to provide a collapsible tray attachment mountable on a serving tray so as to keep the entire surface of the tray free to receive orders.

Another object of this invention is to provide a simple trouble-free structure capable of high production and economical maintenance.

Other objects and advantages found in the construction of my invention will be apparent from a consideration of the following specification in connection with the appended claims and the accompanying drawings.

In the drawings:

Figure 1 is a perspective view of the collapsible tray attachment mounted in its use position on a standard automobile tray shown in phantom lines. The apertured suspension plate is broken away to show the wire frame.

Figure 2 is a front view of the collapsible tray attachment in its use position showing the back support member and support legs in their clamped position on a standard automobile tray. Shown in phantom lines are containers suspended above the tray by inserting them in the various cut-outs provided in the apertured plate.

Figure 3 is a top view of the tray attachment in its collapsed position on a serving tray shown in phantom lines and illustrating the support legs in their folded position beneath the apertured plate.

Figure 4 is a partial cross-section taken on line IV—IV of Figure 2 showing the bracket clamps pivotally connecting the bottom of the back support plate to the rim or edge of a standard serving tray and illustrating the configuration of the clamps.

Figure 5 is a cross-sectional view taken on line V—V of Figure 1 and showing the adjustable clamp structure contained in the legs in position on the edge of a standard tray.

Figure 6 is a perspective view of the fixed member of the adjustable clamp shown in Figure 5 and illustrating the prong arrangement and configuration.

Figure 7 is a side view showing the attachment in its collapsed or storage position on the serving tray.

General description

In general, a serving tray attachment is provided for use with automobile trays. The serving tray attachment is collapsible and lies flat against the serving tray when not in use. A plate is provided having cut-outs therein for receiving various beverage containers such as cups, milk shake glasses, sundae dishes and the like. A back support member is hinged to the rear of the apertured plate and is provided with brackets which pivotally connect the back support member to the rear of a serving tray.

The apertured plate is also provided with two legs, one on each side, which are foldable under the plate when not in use. Each leg is pivotally hinged to the plate and has an adjustable clamp at its free end. This adjustable clamp is designed to clamp onto the side rim of the serving tray on which the collapsible attachment has been mounted.

In their vertical clamped position, the foldable legs cooperate with the back support plate to maintain the plate in a horizontal position parallel to and spacedly above the serving tray. This tripodal type of support provides rigidity and stability to the collapsible attachment when in use and as will be seen hereinafter avoids cluttering the serving tray to which it is attached. It is within the scope of this invention to include structural variations of this tripodal support principle.

Beverage containers placed in the plate cut-outs are thereby suspended above the serving tray. In this manner, space on the tray that would be otherwise occupied by beverage containers is released to accommodate such bulk items as sandwiches and the like. In addition, beverage containers suspended in this manner cannot be spilled and overall stability is thus achieved.

The foldable legs can be retracted beneath the apertured plate when the increased capacity is not needed. The apertured plate and the pivotally connected back support can then be lowered to rest flat against the top surface of the serving tray. The tray may then be used in a normal fashion to serve small sized orders or the tray with attachments can be stored in a stacked position.

Thus, a novel, highly versatile, and highly utilitarian collapsible serving tray attachment is provided for mounting upon standard automobile serving trays, and it will be noted that the structure herein described is easily washed and sanitized with the tray to meet any sanitary standards. The capacity of the serving tray can thus be easily expanded when needed without the necessity of permanent superstructures being built onto the serving tray. In addition, the suspension of beverage containers or bulk items above the surface of the serving tray greatly increases the utility and capacity of the serving tray.

*Specific description*

The collapsible serving tray attachment 11 as shown in Figure 1 is mounted on a standard automobile serving tray 18. This tray may be of the internal or external mounting type. The apertured plate 12 is substantially rectangular in shape, being substantially identical in width to the standard serving tray but shorter in length. The apertured plate 12 is constructed from sheet metal formed over a heavy gauge wire frame 13, as shown in Figure 1. It is within the scope of the invention to utilize parts formed from any suitable materials such as aluminum stamping, plastic extrusion or laminations, plywood and the like. Various forms and sizes of cut-outs 14 are provided in the plate 12 in order to receive and suspend beverage and food containers 15 and the like. The configuration of the cut-outs 14 is not limited to that shown in the drawings, but it is intended that the cut-outs 14 can be changed to provide for any size of container that is served by the "drive-in" restaurants. Several of the cut-outs 14 are provided with cup-handle cut-outs 16. The use of an apertured plate 12 to receive the actual beverage containers provides a serving tray attachment which meets the highest sanitation requirements.

A back support member 17 is also provided that is substantially rectangular in shape. However, the shape of the back support member 17 can be changed to any desired shape as long as it provides the requisite support. It is formed in the same manner as the apertured plate 12 and any suitable materials may be utilized in fabricating it, as in the case of the apertured plate 12.

The back support member 17 is pivotally attached to the rear of the apertured plate 12. In the present embodiment of the invention, tabs 19 and 20 are provided at the top of the back support member 17 which are bent around the wire plate frame 13, as shown in Figures 1 and 3, to hinge the back support member 17 to the apertured plate 12. It is contemplated that any type of hinge could be utilized to join the back support member 17 and the apertured plate 12 along the rear edge thereof.

The bottom portion of the back support member 17 is pivotally connected to brackets 21 and 22 that are mounted on the rim 23 of a standard automobile serving tray 18 as shown in Figure 4. The brackets 21 and 22 are comprised of bracket members 24 and 25 which are configured to matingly clamp on the rim 23 of the standard serving tray 18 and the back support plate wire frame 26, as shown in Figure 4. The bracket members 24 and 25 are fastened by a screw type fastener 27 which allows the back support member 17 to pivot from a vertical position as shown in Figures 1 and 2 to a horizontal position, resting on the upper surface of the serving tray when not in use, as shown in Figures 3 and 7.

Foldable legs 28 and 29 are provided on each side of the apertured plate 12. These foldable legs 28 and 29 are joined to the side edges of the apertured plate 12 by the same hinging arrangement as used in joining the back support member 17 to the plate 12. Here again, other methods of hinging may be utilized to allow the foldable legs 28 and 29 to fold under the apertured plate 12 when not in use. Figures 1 and 2 illustrate the legs 28 and 29 in their upright or use position and Figures 3 and 7 illustrate the legs 28 and 29 in their folded or storage position. The foldable legs 28 and 29 may be formed from the same materials as the other components of the collapsible attachment assembly. In the present embodiment, the configuration of the legs 28 and 29 is such that they matingly fit under the suspension plate when in their storage position, as shown in Figure 3. The shape of the foldable legs 28 and 29 is not intended to be limited to that shown in the drawings.

As shown in Figure 5, a channel 30 is formed at the terminal ends of the legs 28 and 29. An adjustable clamp 31 is contained within the said channel 30 and is comprised of fixed member 32 and a sliding member 33. The fixed member 32 shown in Figure 6, is provided with upper prongs 34 and 35 and a lower prong 36 that matingly fit the rim 23 of a standard serving tray. Prongs 34 and 35 fit above the rim 23 of the tray 18 and prong 36 is configured to matingly fit below the rim of the tray. The sliding member 33 is provided with an actuating arm 37.

A rivet 38 anchors the fixed member 32 to the wall 39 of the foldable legs within the channel 30. The rivet 38 extends into a slot 40 provided in the center of the sliding member 33. The sliding member 33 is movable within the channel 30 adjacent the fixed member 32. The limits of movement of the slidable member is determined by the rivet 38 co-acting within the slot 40. The slidable member 33 is provided with a prong 41 that matingly fits the upper surface of the rim 23 and cooperates with prongs 34, 35 and 36 of the fixed member 32 to clamp the legs 28 and 29 to the rim or edge 23 of the tray 18 when moved downwardly as shown in Figures 1 and 5. It is within the scope of this invention that the clamp may be of the spring tension type so as to snap into position on the rim or edge of a serving tray so as to provide greater ease in setting up the attachment in its use position as shown in Figure 1.

Although the drawings illustrate the present invention as being positioned at one end of a standard automobile serving tray, it is also within the scope of the present invention to alter the serving tray so as to adapt it for longitudinal mounting upon the standard serving trays. In the longitudinally-mountable embodiment of the attachment, the suspension plate and back support member are increased in length to equal the length of the standard serving tray. The suspension plate is proportionately narrowed so as to maintain its utility and versatility.

*Operation*

In use, the serving tray attachment 11 is mounted upon a standard automobile serving tray. The pivotal brackets 21 and 22 are attached to the rim of a standard automobile serving tray. When in a storage position, the back support member 17 and the apertured plate 12 lie flat upon the upper surface of the standard serving tray with the foldable support legs 28 and 29 in their folded position beneath the apertured plate 12, as shown in Figure 7.

When needed to increase the capacity of the serving tray, the attachment is raised to its operative position, as shown in Figure 1. The support legs 28 and 29 are attached to the rims of the tray, suspending the apertured plate 12 in a stable manner horizontally above the tray. In this position, the apertured plate 12 suspends beverage containers and bulk items above the tray. The containers are placed in the cut-outs provided in the plate, as shown in Figure 2, and cannot be tipped or spilled.

With the beverage containers suspended in this manner above the tray, increased space is made available on the tray for bulk items such as sandwiches. While the loaded tray is being carried to an automobile and while it is being mounted on an automobile door, either on the inside or outside, this attachment utilizing a suspension method of supporting the beverage containers prevents spillage and provides a stable food handling platform that will materially increase the capacity of a standard automobile serving tray.

The increase in capacity of a standard serving tray is thus brought about without materially increasing the overall clearance, size, or weight of the tray.

The use of the unique collapsible tripodal mounting provides an additional food-handling platform while keeping the entire surface of the tray below free to receive food and beverage articles ordered by the customers.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

1. In a collapsible attachment for automobile serving trays, the combination including: a suspension plate; an intermediate rear support member pivotally attached to said suspension plate and pivotally clampable to the rim of an automobile serving tray; foldable support legs pivotally attached to said plate; clamping means provided in the terminal ends of said support legs for clamping onto the rim of an automobile serving tray and cooperating with said rear support member to position said suspension plate spacedly above an automobile tray, said legs foldable beneath said plate to allow said plate and said rear support member to lie flat against the upper surface of the serving tray in a storage position.

2. In a structure for selectively providing an elevated food receiving platform parallel to and above the principal level of a rimmed food tray, the combination including: a platform plate; a pair of legs hingedly attached to opposite sides of said plate and selectively foldable thereunder; clips on the lower ends of said legs for securing said legs to the rim of a food tray; a stabilizing back support member hinged to said platform plate and depending therefrom; a clamp at the lower end of said stabilizing back support member for pivotally securing said support member against accidental dislodgement and attachable to the rim of a food tray, said back support member adapted to cooperate with said legs to selectively maintain said platform plate parallel to and spacedly above a food tray.

3. In a collapsible attachment for automobile serving trays, the combination including: an apertured suspension plate; an intermediate support member pivotally attached to said apertured suspension plate and pivotally clampable to the rim of an automobile serving tray; foldable support legs pivotally attached to said apertured suspension plate; clamping means provided in the terminal ends of said support legs for clamping onto the rim of an automobile serving tray and cooperating with said intermediate support member to position said apertured suspension plate spacedly above an automobile serving tray, said legs foldable beneath said apertured suspension plate to allow said apertured suspension plate and said intermediate support member to lie flat against the upper surface of the serving tray in a storage position.

References Cited in the file of this patent

UNITED STATES PATENTS

| | | |
|---|---|---|
| 1,623,100 | Dolan | Apr. 5, 1927 |
| 1,631,355 | Baldwin | June 7, 1927 |
| 1,724,320 | Skultety | Aug. 13, 1929 |
| 1,784,264 | Young | Dec. 9, 1930 |
| 1,862,010 | Ehrlich | June 7, 1932 |
| 1,872,669 | Burlin | Aug. 23, 1932 |
| 1,877,784 | Anderson | Sept. 20, 1932 |
| 1,980,575 | Covert | Nov. 13, 1934 |
| 2,048,695 | Hasehour | July 28, 1936 |
| 2,296,028 | Gribble | Sept. 15, 1942 |
| 2,526,793 | Alfred | Oct. 24, 1950 |
| 2,903,311 | Earhart | Sept. 8, 1959 |